United States Patent
Fujiwara et al.

(10) Patent No.: US 10,930,910 B2
(45) Date of Patent: Feb. 23, 2021

(54) POWER STORAGE MODULE

(71) Applicant: TOYOTA JIDOSHA KABUSHIKI KAISHA, Toyota (JP)

(72) Inventors: Nobuyoshi Fujiwara, Nagoya (JP); Satoshi Morioka, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 152 days.

(21) Appl. No.: 16/056,703

(22) Filed: Aug. 7, 2018

(65) Prior Publication Data
US 2019/0067658 A1 Feb. 28, 2019

(30) Foreign Application Priority Data

Aug. 22, 2017 (JP) .............................. JP2017-159335
May 17, 2018 (JP) .............................. JP2018-095364

(51) Int. Cl.
*H01M 2/12* (2006.01)
*H01M 2/10* (2006.01)

(52) U.S. Cl.
CPC ....... *H01M 2/1241* (2013.01); *H01M 2/1016* (2013.01); *H01M 2/1072* (2013.01); *H01M 2200/10* (2013.01)

(58) Field of Classification Search
None
See application file for complete search history.

(56) References Cited

U.S. PATENT DOCUMENTS

| | | | |
|---|---|---|---|
| 2006/0257056 A1* | 11/2006 | Miyake | B65D 75/5805 383/103 |
| 2007/0164711 A1 | 7/2007 | Kim et al. | |
| 2014/0154541 A1 | 6/2014 | Asakura et al. | |
| 2014/0308550 A1* | 10/2014 | Shimizu | H01M 2/1241 429/56 |
| 2017/0214103 A1* | 7/2017 | Onnerud | H01G 11/10 |
| 2017/0346050 A1 | 11/2017 | Morioka | |

FOREIGN PATENT DOCUMENTS

| | | |
|---|---|---|
| CN | 1996640 A | 7/2007 |
| CN | 102229270 A | 11/2011 |
| JP | 2014-110138 A | 6/2014 |
| JP | 2017-212065 A | 11/2017 |

* cited by examiner

*Primary Examiner* — Jonathan G Jelsma
*Assistant Examiner* — Kirsten B Tysl
(74) *Attorney, Agent, or Firm* — Sughrue Mion, PLLC

(57) ABSTRACT

A power storage module includes: a plurality of power storage elements; a power storage case accommodating the plurality of power storage elements; and a gas generator disposed in the power storage case, the plurality of power storage elements each having an exhausting portion, the power storage case having an exhaust channel formed therein to pass an exhaust gas exhausted from the exhausting portion, the gas generator being disposed in the exhaust channel, the gas generator supplying a supply gas into the exhaust channel when the gas generator attains an internal temperature equal to or higher than a predetermined temperature.

7 Claims, 15 Drawing Sheets

POWER STORAGE MODULE

This nonprovisional application is based on Japanese Patent Application No. 2017-159335 filed on Aug. 22, 2017 and Japanese Patent Application No. 2018-095364 filed on May 17, 2018, with the Japan Patent Office, the entire contents of which are hereby incorporated by reference.

BACKGROUND

Field

The present disclosure relates to a power storage module.

Description of the Background Art

Conventionally, a battery module including a plurality of battery cells and an accommodation case for accommodating the plurality of battery cells is known.

As the battery cell, a lithium ion cell or the like is adopted. When such a battery cell is overcharged, internally short-circuited or the like, the battery cell internally has high temperature and high pressure. Accordingly, each battery cell is provided with an exhaust valve to exhaust gas in the battery cell to prevent the battery cell from internally reaching high temperature and high pressure.

For example, Japanese Patent Laying-Open No. 2014-110138 discloses a battery module comprising a module case, a plurality of cylindrical battery cells, a metallic holder, a positive electrode bus bar, a negative electrode bus bar, an insulating sheet, and a positive electrode cover.

The module case houses the plurality of battery cells, the holder and the like therein. The holder is disposed in the module case, and the holder has a circular through hole receiving a cylindrical battery cell.

Each battery cell includes a positive electrode terminal formed on an upper end side and a negative electrode terminal formed on a lower end side. A gas discharge valve is formed at the positive electrode terminal. The positive electrode bus bar is formed in the form of an elongate plate. The positive electrode bus bar is disposed on the side of the upper surface of the module case and is connected to each positive electrode terminal of the plurality of battery cells.

The insulating sheet is disposed on an upper surface of the positive electrode bus bar. The positive electrode cover is disposed on the side of the upper surface of the insulating sheet. A fume exhaust route is formed between the insulating sheet and the positive electrode cover. The fume exhaust route has connected thereto an exhaust port formed at the module case.

Each battery cell exhausts gas which in turn passes through the fume exhaust route and is thus discharged outside the battery module.

SUMMARY

When a battery cell is overcharged, internally short-circuited or the like, various exothermic reactions arise in the battery cell, and the battery cell's internal temperature is increased and the battery cell's internal pressure is also increased. When the gas discharge valve of the battery cell is opened, exhaust gas is externally discharged.

Generally, a power storage module has an exhaust duct connected thereto, and exhaust gas passes through the fume exhaust route and the exhaust duct and is externally exhausted.

However, if there is a gap at a portion connecting the exhaust duct and the power storage module, the exhaust gas externally leaks through the gap.

The exhaust gas may contain substances such as $C_2H_4$, $CH_4$, and hydrogen. If a gas such as hydrogen having high concentration leaks from the power storage module, it may have various adverse effects on the surroundings of the power storage module.

The present disclosure has been made in view of the above problem, and an object thereof is to provide a power storage module capable of suppressing external leakage of exhaust gas having high concentration even if the exhaust gas leaks from the power storage module.

A power storage device according to the present disclosure comprises a plurality of power storage elements, a power storage case that houses the plurality of power storage elements, and a gas generator that is disposed in the power storage case. The plurality of power storage elements each have an exhausting portion. The power storage case has an exhaust channel formed therein to pass an exhaust gas exhausted from the exhausting portion. The gas generator is disposed in the exhaust channel, and the gas generator supplies a supply gas into the exhaust channel when the gas generator attains an internal temperature equal to or higher than a predetermined temperature.

In the above power storage module, when a specific power storage element is overcharged, internally short-circuited or the like, an exothermic reaction arises therein and exhaust gas of high temperature is blown from the exhausting portion.

The exhaust gas enters the exhaust channel. In the exhaust channel, the gas generator is disposed, and the gas generator is warmed by the exhaust gas. Then, when the gas generator's internal temperature reaches a predetermined temperature or higher, the supply gas is supplied into the exhaust channel. The supply gas supplied into the exhaust channel can reduce the exhaust gas's concentration to be low.

If the exhaust gas after having passed through the exhaust channel leaks out of the power storage module, external leakage of exhaust gas of high concentration can be suppressed.

The gas generator includes a gas agent that serves as the supply gas as the gas agent evaporates, and a reservoir case that reserves the gas agent. The reservoir case includes a thick film portion disposed upstream of the gas agent in a direction in which the exhaust gas flows, and a thin film portion having a thickness smaller than the thick film portion. The thick film portion includes a facing surface to which the exhaust gas is blown, and a back surface facing away from the facing surface. The thin film portion is located downstream of the thick film portion in the direction in which the exhaust gas flows, and is also located on the side of the back surface.

When a power storage element is overcharged, internally short-circuited or the like, an exothermic reaction may excessively arise therein. When the exothermic reaction excessively arises, the power storage element's internal pressure increases. When the internal pressure increases, the exothermic reaction is activated. In an initial state in which the exhaust gas is discharged from the exhausting portion, the power storage element has a high internal pressure. When the exhaust gas starts to be discharged, the power storage element's internal pressure is also reduced, and the exothermic reaction also becomes less active than in the initial state.

Thus, the exhaust gas is discharged in a large amount in the initial stage of discharging from the exhausting portion.

Thereafter, a relatively small amount of exhaust gas is continuously exhausted from the exhausting portion.

The exhaust gas contains a flammable substance, and if it continuously leaks outside the power storage module, it may continuously affect equipment external to the power storage module.

In the above-described power storage module, in contrast, even if a large amount of high-temperature exhaust gas is instantaneously discharged in the initial state, the exhaust gas will mainly be blown to the thick film portion.

Accordingly, if a high-temperature exhaust gas is blown to the thick film portion for a short time, the heat of the exhaust gas is prevented from reaching the gas agent through the thick film portion.

Since the thin film portion is disposed on the side of the back surface of the thick film portion, blowing of high temperature exhaust gas directly to the thin film portion can be suppressed. This can suppress transfer of the heat of the exhaust gas to the gas agent through the thin film portion.

This can suppress warming of the gas agent during the initial state when the exhaust gas starts to be discharged, and can thus suppress an increase of the temperature of the gas agent (the internal temperature of the gas generator).

As an increase of the temperature of the gas agent can be suppressed, evaporation of the gas agent in the initial state when the exhaust gas starts to be discharged, and hence generation of the supply gas, can be suppressed.

On the other hand, when the exhaust gas continues to flow, the heat of the exhaust gas is transferred to the gas agent through the thick film portion or the like.

As a result, when the exhaust gas continues to flow, the gas agent evaporates and the supply gas starts to be generated in the reservoir case, and the reservoir case's internal pressure increases.

When the reservoir case's internal pressure increases, the thin film portion is ruptured, and the supply gas is supplied to the exhaust channel through the ruptured portion. This can suppress the concentration of the exhaust gas flowing through the exhaust channel to be low. As a result, even if the exhaust gas leaks from the power storage module continuously, leakage of exhaust gas of high-concentration from the power storage module can be suppressed.

The thick film portion contacts the gas agent. In this power storage module, heat is transferred to the gas agent through the thick film portion.

The exhaust channel includes an ingress space receiving the exhaust gas exhausted from the exhausting portion, and the gas generator is disposed downstream of the ingress space in the direction in which the exhaust gas flows.

According to the above-described power storage module, even if exhaust gas is blown out of any one of the plurality of power storage element, the exhaust gas can be blown to the gas generator.

In the above power storage module, the gas generator includes a gas agent that serves as the supply gas as the gas agent evaporates, and a reservoir case that reserves the gas agent. The reservoir case includes a case body having an opening formed therein and a thin film portion closing the opening. The case body includes a bottom portion and a peripheral wall portion extending upward from an outer peripheral edge portion of the bottom portion. The bottom portion is formed with a protrusion protruding toward the opening.

In the above-described power storage module, when the reservoir case with the protrusion is compared with a reservoir case which is of the same build as the reservoir case with the protrusion and furthermore, reserves the gas agent in the same amount as the reservoir case with the protrusion does, and does not have the protrusion, the former reserves the gas agent with an upper surface higher in level than the latter does. The gas agent having an upper surface higher in level contacts the reservoir case body over a large area. The large contact area can suppress temperature variation in the gas agent when heat from the exhaust gas is transferred to the gas agent through the case body. This can suppress rupture of the thin film portion after the gas agent is otherwise locally heated and accordingly evaporates which in turn increases internal pressure in the reservoir case and causes the exhaust gas to blow out before a predetermined period of time elapses.

In the above power storage module, a bonding portion at which the thin film portion and the case body are adhered together is formed along the opening, and the protrusion has an upper end portion below the opening.

In the above-described power storage module, the reservoir case's internal pressure increases and the protrusion may be deformed. Since the protrusion is separated from the opening, deformation of the opening can be suppressed even if the case body has deformed the protrusion and a portion located therearound. Since deformation of the opening of the case body is suppressed, reduction of an adhesive force of the adhesion portion formed along the opening can be suppressed.

In the above power storage module, the case body includes a first resin layer, a barrier layer, and a second resin layer. The barrier layer is provided between the first resin layer and the second resin layer and also adhered to the first resin layer and the second resin layer. The first resin layer and the second resin layer are formed of polypropylene, and the barrier layer is formed of nylon.

According to the above power storage module, peeling strength between the first and second resin layers and the barrier layer can be increased. Even if the reservoir case has an increased internal pressure, peeling between the first and second resin layers and the barrier layer can be suppressed. Furthermore, leakage of the gas agent out of the reservoir case through a wall surface of the case body can be suppressed.

In the above power storage module, a bonding portion at which the thin film portion and the case body are adhered together is formed along the opening, the opening has an opening edge portion including a plurality of arcuate corner portions and a plurality of side portions, and the corner portions each have an opening angle of 85 degrees or more and less than 180 degrees.

According to the above power storage module, when the reservoir case's internal pressure is increased, internal pressure is applied to the thin film portion, and a load is applied to the adhesion portion in a direction to separate the thin film portion from the case body. In particular, at a corner portion of the opening, stress tends to concentrate at the adhesion portion.

When the corner portion has an opening angle smaller than 85 degrees, a large stress tends to concentrate in the corner portion at the adhesion portion, and the thin film portion easily peels off the case body. In addition, when the corner portion has an opening angle of 180 degrees or more, large stress tends to concentrate in the corner portion, and the thin film portion easily peels off the case body.

In contrast, the opening having a corner portion with an opening angle of 85 degrees or more and less than 180 degrees can suppress peeling of the thin film portion off the case body.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

With reference to FIG. 1 to FIG. 24, power storage modules according to first to third embodiments will be described. Of the configurations shown in FIG. 1 to FIG. 24, any configuration that is identical or substantially identical is identically denoted and may not be described redundantly.

First Embodiment

Figure 1:
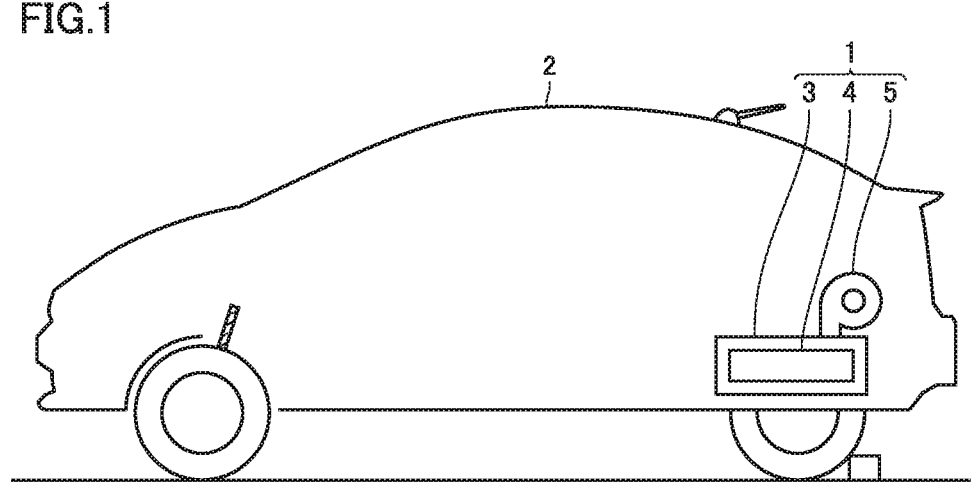
FIG. 1 is a schematic diagram showing a vehicle 2 with a power storage device 1 mounted therein.

FIG. 1 is a schematic diagram showing a vehicle 2 with a power storage device 1 mounted therein. Vehicle 2 includes power storage device 1 disposed therein. Note that vehicle 2 with power storage device 1 mounted therein includes a hybrid vehicle, an electrically powered vehicle such as an electric vehicle and a fuel cell vehicle, and the like. Power storage device 1 includes a battery case 3, a battery unit 4, and a fan 5. Battery unit 4 is housed in battery case 3, and fan 5 supplies battery case 3 with the air inside the passenger compartment.

Figure 2:
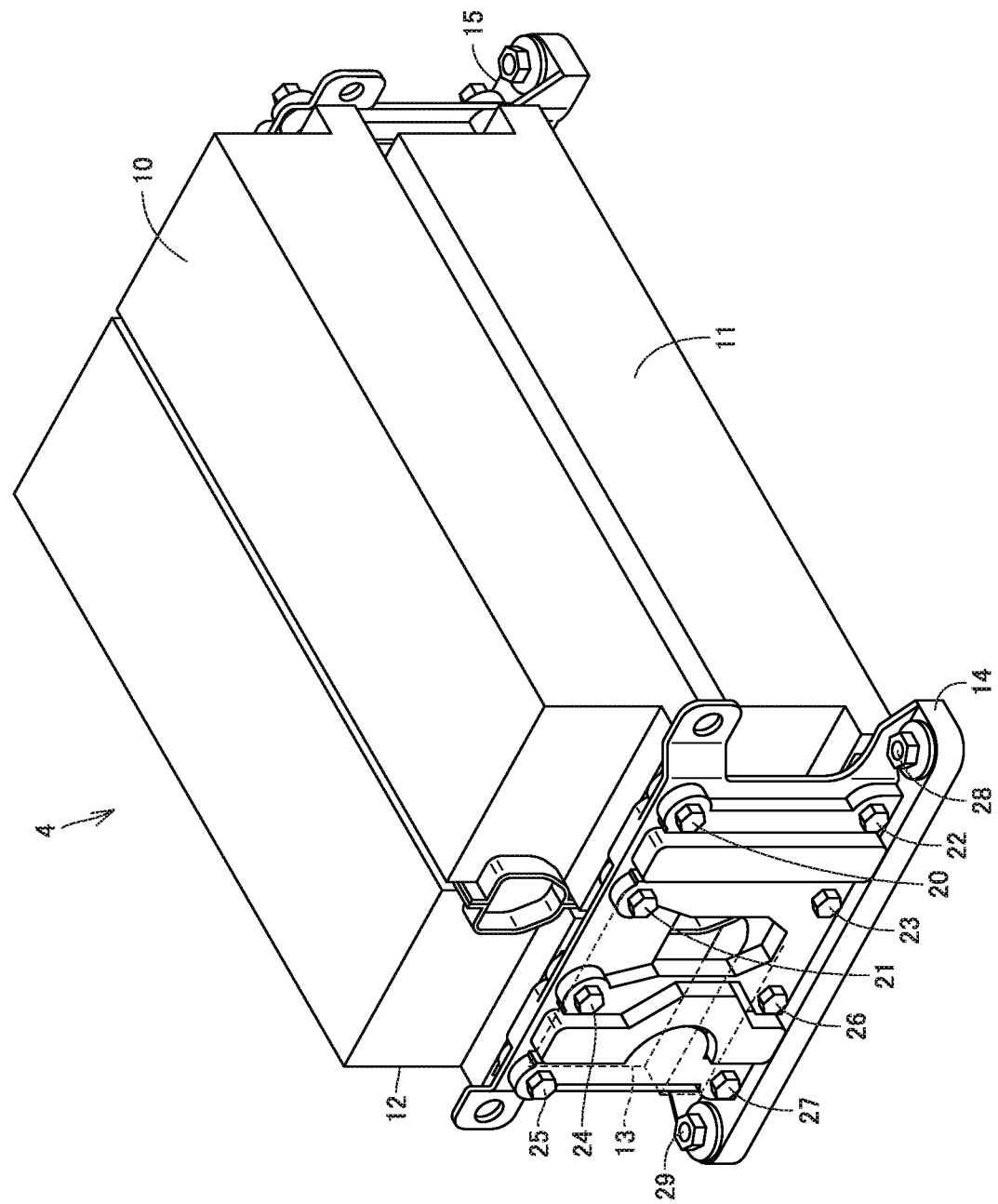
FIG. 2 is a perspective view showing a battery unit 4 of power storage device 1.

FIG. 2 is a perspective view showing battery unit 4 of power storage device 1. Battery unit 4 includes a plurality of battery modules 10, 11, 12, 13, and fixing plates 14, 15 provided at opposite ends of battery unit 4. Battery unit 4 has a substantially rectangular parallelepiped shape and is disposed so as to be elongate in the widthwise direction of vehicle 2.

Fixing plate 14 is provided at one end of battery unit 4 in its longitudinal direction, and fixing plate 15 is provided at the other end of battery unit 4 in its longitudinal direction.

Fixing plate 14 is fixed to battery modules 10, 11, 12, 13 by a plurality of bolts 20, 21, 22, 23, 24, 25, 26, 27, and by fixing plate 14 battery modules 10, 11, 12, 13 are fixed to one another. Fixing plate 14 is fixed to a bottom surface of battery case 3 by bolts 28, 29. As well as fixing plate 14, fixing plate 15 is also fixed to battery modules 10, 11, 12, 13 and the bottom surface of battery case 3.

Thus, battery modules 10, 11, 12, 13 are connected to one another by fixing plates 14, 15 and also fixed to the bottom surface of battery case 3 by fixing plates 14, 15.

Figure 3:
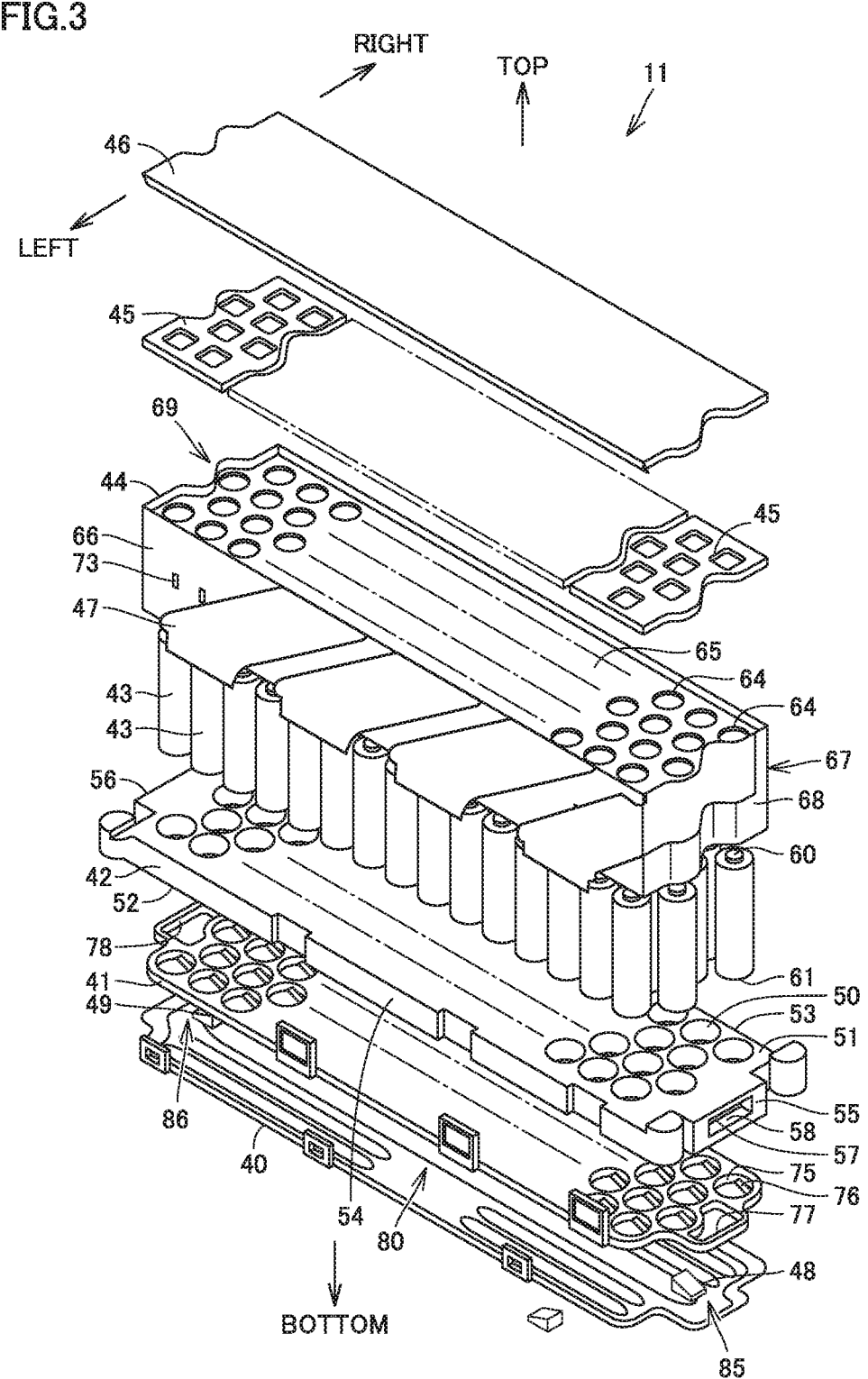
FIG. 3 is an exploded perspective view showing a battery module 11.

FIG. 3 is an exploded perspective view showing battery module 11. Battery module 11 includes a bottom lid 40, a negative electrode bus bar assembly 41, a heat dissipating plate 42, a cylindrical cell 43, a resin cover 44, a positive electrode bus bar 45, a ceiling lid 46, a plurality of connecting plates 47, and gas generators 48 and 49.

Heat dissipating plate 42 is a metal plate member. Heat dissipating plate 42 has a plurality of through holes 50 extending therethrough in the direction of the thickness of heat dissipating plate 42. Through holes 50 are formed in an array.

Heat dissipating plate 42 includes an upper surface 51, a lower surface 52, a pair of side surfaces 53, 54, and a pair of end surfaces 55, 56. Each through hole 50 extends from upper surface 51 to lower surface 52.

Heat dissipating plate 42 has an exhaust path and an exhaust port on each side of end surface 55 and end surface 56. While FIG. 3 shows exhaust path 57 and exhaust port 58 formed on the end surface 55 side, the same exhaust path and port are also formed on the end surface 56 side. Exhaust path 57 is formed to extend from lower surface 52 so as to enter heat dissipating plate 42 and then extend toward end surface 55. Exhaust path 57 is connected to exhaust port 58 formed in end surface 55.

Cylindrical cell 43 is a chargeable/dischargeable secondary cell. Cylindrical cell 43 is, for example, a nickel metal hydride cell, a lithium ion cell, or the like. A positive electrode 60 is formed at an upper end portion of cylindrical cell 43, and a negative electrode 61 is formed at a lower end portion of cylindrical cell 43. While in this embodiment an example in which a cylindrical cell is adopted as a power storage unit has been described, it may be a prismatic cell or a capacitor.

Cylindrical cell 43 is inserted into through hole 50 formed in heat dissipating plate 42. Positive electrode 60 of cylindrical cell 43 is disposed above upper surface 51 of heat dissipating plate 42, and negative electrode 61 of cylindrical cell 43 is located below lower surface 52 of heat dissipating plate 42. Positive electrode 60 is formed at an upper end portion of cylindrical cell 43, and negative electrode 61 is formed at a lower end portion of cylindrical cell 43.

A resin or the like is disposed between the inner circumferential surface of through hole 50 of heat dissipating plate 42 and the outer circumferential surface of cylindrical cell 43, and cylindrical cell 43 is thus fixed to heat dissipating plate 42.

Resin cover 44 is disposed on upper surface 51 of heat dissipating plate 42. Resin cover 44 is formed so as to open downward, and resin cover 44 includes a top plate 65, a pair of side walls 66, 67, and a pair of end walls 68, 69.

Side wall 66 has a plurality of vents 73 formed therethrough. Vents 73 are spaced in the longitudinal direction of side wall 66. As well as side wall 66, side wall 67 also has a plurality of vents formed therethrough. Side walls 66 and 67 and end walls 68 and 69 have lower end portions, respectively, on upper surface 51 of heat dissipating plate 42.

The plurality of positive electrode bus bars 45 are disposed on the top plate 65 side of resin cover 44. For example, each positive electrode bus bar 45 connects positive electrodes 60 of about 10 cylindrical cells 43 in parallel.

Ceiling lid 46 is disposed above positive electrode bus bar 45. Ceiling lid 46 is formed of an insulating material such as resin.

Negative electrode bus bar assembly 41 is disposed on the lower surface 52 side of heat dissipating plate 42. Negative electrode bus bar assembly 41 includes a plurality of negative electrode bus bars (not shown) and a resin mold molding the plurality of negative electrode bus bars. The external shape of the negative electrode bus bar and the external shape of positive electrode bus bar 45 are similar. A plurality of holes 75 are formed in negative electrode bus bar assembly 41 (or negative electrode bus bars). In each hole 75, a terminal 76 is formed so as to protrude from an inner circumferential surface of hole 75. Terminal 76 is connected to negative electrode 61 of cylindrical cell 43.

The negative electrode bus bar is formed to connect negative electrodes 61 of the same cylindrical cells 43 as positive electrode bus bar 45 in parallel.

The plurality of connecting plates 47 are provided at side wall 66. Each connecting plate 47 connects positive electrode bus bar 45 and a negative electrode bus bar. The plurality of connecting plates 47 serially connect the plurality of positive electrode bus bars 45 and the plurality of negative electrode bus bars. When it is assumed that a plurality of cylindrical cells 43 connected in parallel by positive electrode bus bar 45 and negative electrode bus bar form a cylindrical cell group, a plurality of cylindrical cell groups are connected in series by connecting plate 47.

An exhaust path 77 is formed at one end of negative electrode bus bar assembly 41 and an exhaust path 78 is formed at the other end thereof. Exhaust paths 77, 78 are formed so as to penetrate negative electrode bus bar assembly 41 in the direction of the thickness thereof.

Exhaust path 77 communicates with exhaust path 57 formed in heat dissipating plate 42. Exhaust path 78 communicates with an exhaust path formed in heat dissipating plate 42 on the end surface 56 side.

Bottom lid 40 is disposed on the side of the lower surface of negative electrode bus bar assembly 41. Bottom lid 40 is made of a metal such as aluminum.

Figure 4:
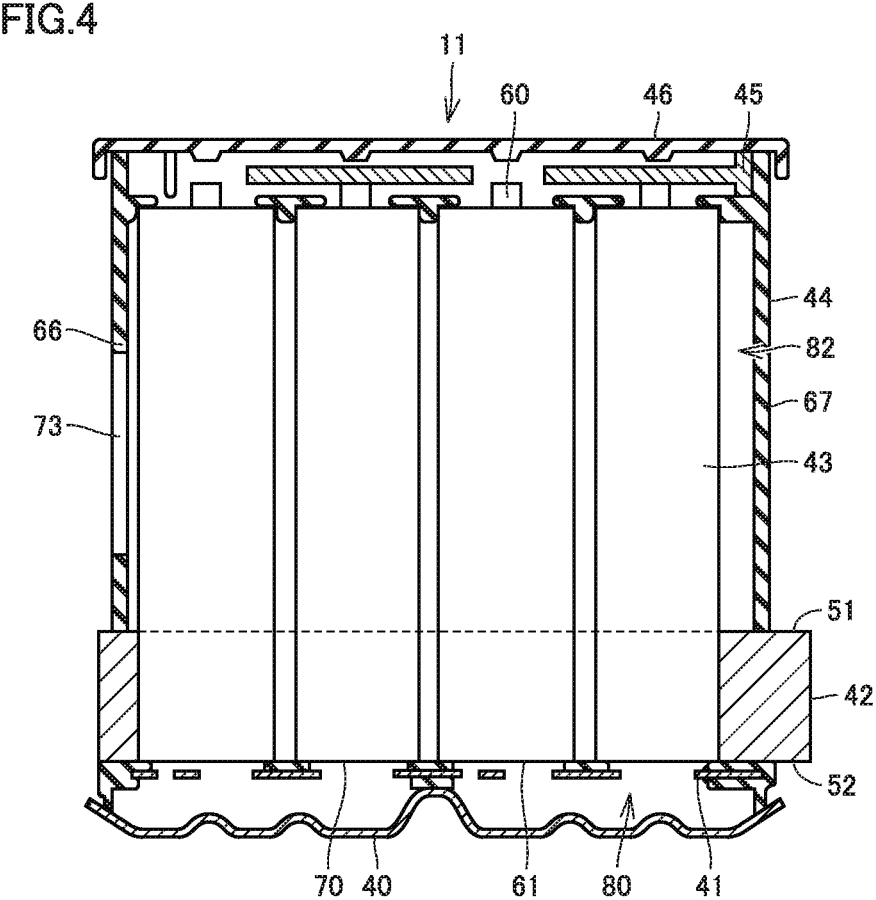
FIG. 4 is a cross-sectional view showing battery module 11 and its periphery.
Figure 5:
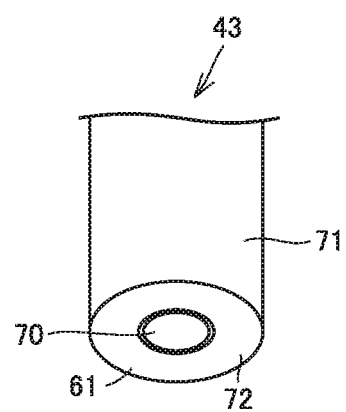
FIG. 5 is a perspective view showing a lower surface side of a cylindrical cell 43.

FIG. 4 is a cross-sectional view showing battery module 11 and therearound. As shown in FIG. 4, an exhaust path 80 is formed by bottom lid 40 and negative electrode bus bar assembly 41. FIG. 5 is a perspective view showing the side of the lower surface of cylindrical cell 43. Cylindrical cell 43 includes a circumferential wall portion 71 and a lower wall portion 72. Negative electrode 61 and an exhausting portion 70 are formed at lower wall portion 72.

At lower wall portion 72, the thickness of the portion where exhausting portion 70 is located is smaller than the thickness of the remaining portion. Accordingly, when cylindrical cell 43 has an internal pressure increased to a predetermined pressure or larger, exhausting portion 70 is broken. From the broken portion, exhaust gas is discharged outside cylindrical cell 43. Referring to FIG. 4, exhausting portion 70 of each cylindrical cell 43 is exposed to exhaust path 80.

Vents 73 receive air from fan 5 shown in FIG. 1 for cooling. The cooling air enters battery module 11, cools the plurality of cylindrical cells 43, and is thereafter exhausted through the vents formed through side wall 67.

Figure 6:
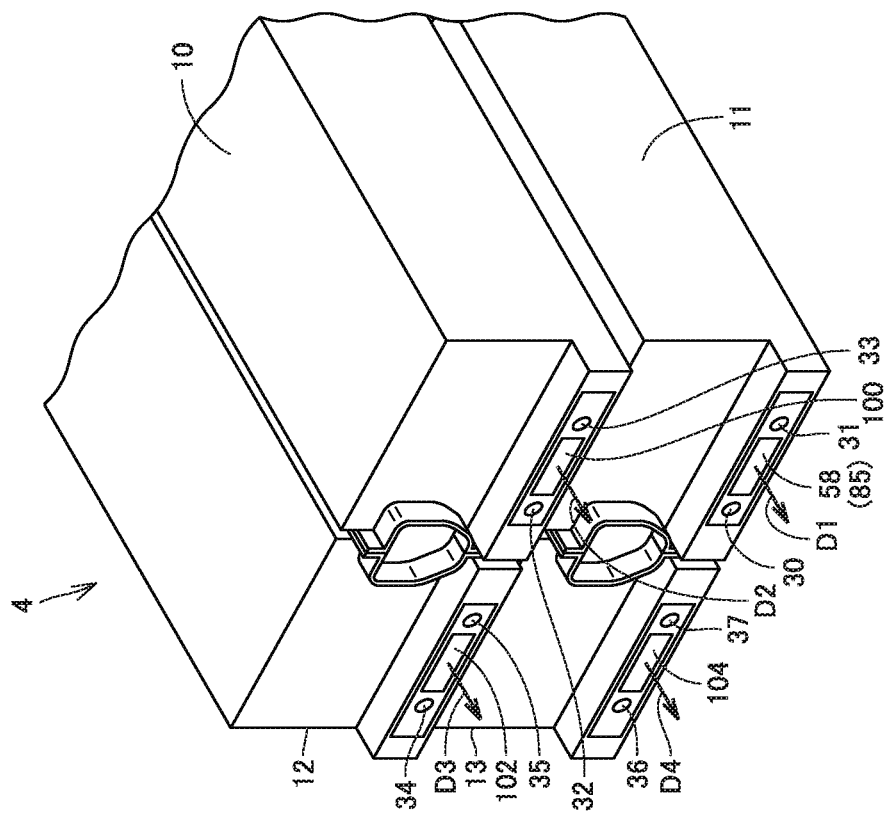
FIG. 6 is a perspective view of battery unit 4 with a fixing plate 14 removed.
Figure 6:
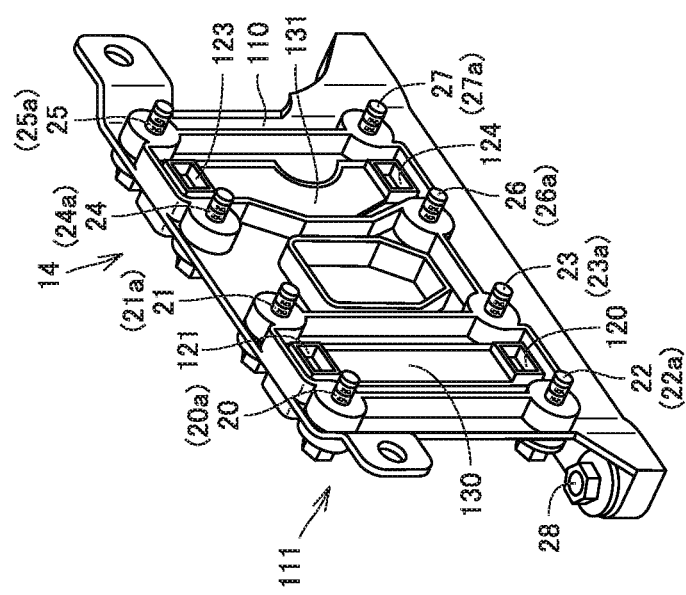

FIG. 6 is a perspective view of battery unit 4 with fixing plate 14 removed. As shown in FIG. 6, battery module 11 has one end surface with an exhaust port 58 and bolt holes 30, 31.

Battery module 10 has one end surface with an exhaust port 100 and bolt holes 32, 33. Battery module 12 has one end surface with an exhaust port 102 and bolt holes 34, 35. Battery module 13 has one end surface with an exhaust port 104 and bolt holes 36, 37.

Bolts 20, 21, 22, 23, 24, 25, 26 and 27 of fixing plate 14 are inserted in bolt holes 30 to 37. Bolt holes 30, 31, 32, 33, 34, 35, 36, 37, have internal surfaces threaded to engage with shanks 20a, 21a, 22a, 23a, 24a, 25a, 26a, 27a of bolts 20, 21, 22, 23, 24, 25, 26, 27, respectively, and fixing plate 14 is fixed to battery modules 10, 11, 12, 13 at their respective one ends.

Fixing plate 14 is formed in a plate and includes an outer surface 111 and a facing surface 110. Facing surface 110 is a surface facing battery unit 4.

Fixing plate 14 has facing surface 110 with a plurality of exhaust ports 120, 121, 123, 124, and fixing plate 14 internally has an exhaust channel 130 and an exhaust channel 131.

In a state with fixing plate 14 fixed to battery unit 4, exhaust port 120 is connected to exhaust port 58. Exhaust port 121 is connected to exhaust port 100.

Exhaust port 123 is connected to exhaust port 102. Exhaust port 124 is connected to exhaust port 104.

Exhaust port 120 and exhaust port 121 are connected to exhaust channel 130. Exhaust channel 130 is connected to an exhaust port formed through the lower surface of fixing plate 14.

Figure 7:
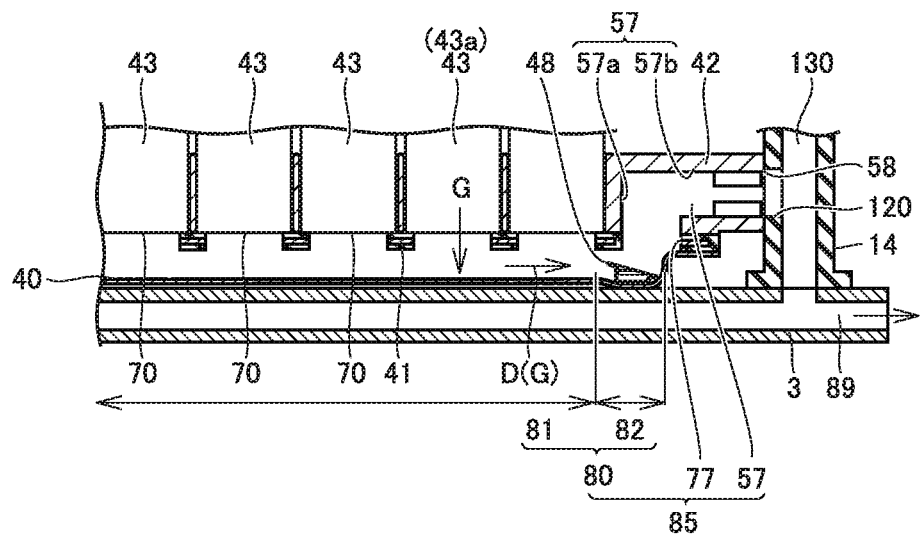
FIG. 7 is a cross-sectional view showing an exhaust port 58 of battery module 11 and a configuration therearound.

Exhaust port 123 and exhaust port 124 are connected to exhaust channel 131. Exhaust channel 131 is connected to an exhaust port formed through the lower surface of fixing plate 14. FIG. 7 is a cross-sectional view showing exhaust port 58 of battery module 11 and a configuration therearound.

Battery case 3 has a lower wall portion with an exhaust channel 89 therethrough. Exhaust channel 89 communicates with an outside of vehicle 2. Exhaust channel 130 of fixing plate 14 communicates with exhaust channel 89. Exhaust channel 89 communicates with an outside of the vehicle.

In FIGS. 3 and 7, exhaust path 80 communicates with exhaust path 77 formed at an end portion of negative electrode bus bar assembly 41. Exhaust path 77 communicates with exhaust path 57 formed through heat dissipating plate 42.

Exhaust path 80, exhaust path 77, and exhaust path 57 form an exhaust channel 85. Exhaust channel 85 is connected to exhaust port 58. Similarly, exhaust path 80, exhaust path 78, shown in FIG. 3, and the exhaust path formed on the end surface 56 side form an exhaust channel 86.

Exhaust path 57 shown in FIG. 7 includes a vertical path 57a and a horizontal path 57b. Vertical path 57a is formed so as to extend upward from a portion connecting it to exhaust path 77. Horizontal path 57b is formed so as to extend horizontally from a portion connecting it to vertical path 57a. Horizontal path 57b is connected to exhaust port 58.

Exhaust path 80 includes an ingress space 81 and a collection space 82. Ingress space 81 is a space receiving exhaust gas G discharged from exhausting portion 70 of each cylindrical cell 43. Ingress space 81 is located under each cylindrical cell 43.

Collection space 82 is located downstream of ingress space 81 in a direction D in which exhaust gas G flows. In collection space 82, exhaust gas G discharged from each exhausting portion 70 is collected.

Gas generator 48 is disposed in exhaust channel 85 downstream of ingress space 81 in direction D. Specifically, gas generator 48 is disposed in collection space 82 of exhaust path 80.

Figure 8:
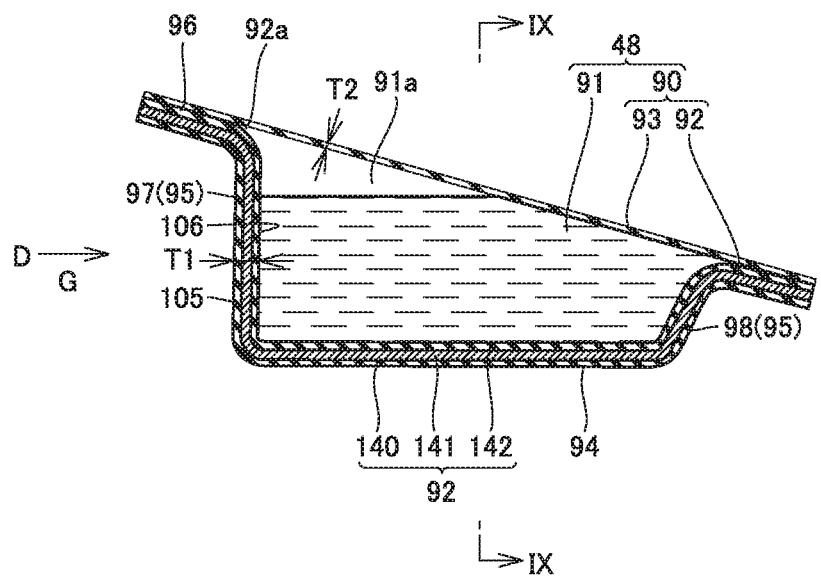
FIG. 8 is a cross-sectional view showing a gas generator 48 and a configuration therearound.

FIG. 8 is a cross-sectional view showing a configuration of gas generator 48. Gas generator 48 includes a reservoir case 90 and a gas agent 91.

Gas agent 91 is, for example, a fire extinguishing agent of halide such as Novec® 1230. Gas agent 91 has high water-repellent and insulating properties. Gas agent 91 has a boiling point of about 50° C., and accordingly, in a normal state, gas agent 91 is in a liquid state. It should be noted that gas agent 91 is not limited to the above example, and may be an aqueous solution of potassium carbonate or the like that exhibits a cooling effect.

Reservoir case 90 includes a case body 92 and a thin film portion 93. Case body 92 has an opening 92a which opens upward, and thin film portion 93 is disposed so as to close opening 92a.

A film thickness T1 of case body 92 is larger than a film thickness T2 of thin film portion 93. Film thickness T1 is, for example, about 0.5 mm, and film thickness T2 is about 0.15 mm.

Figure 9:
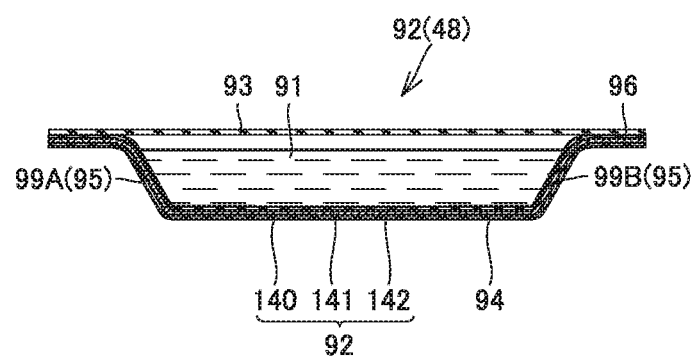
FIG. 9 is a cross-sectional view taken along a line IX-IX shown in FIG. 8.
Figure 10:
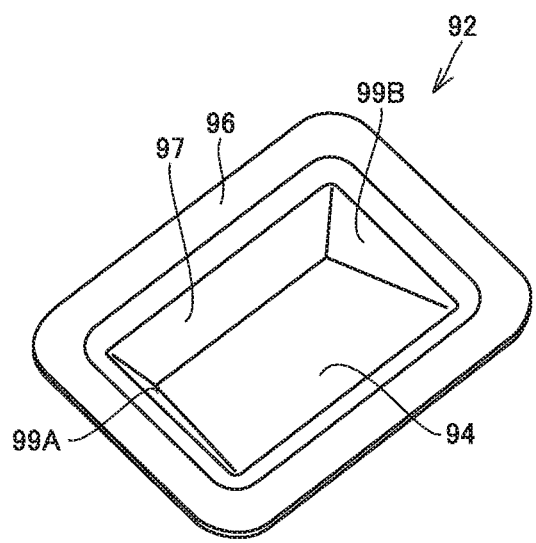
FIG. 10 is a perspective view showing gas generator 48.

FIG. 9 is a cross-sectional view taken along a line IX-IX shown in FIG. 8. FIG. 10 is a perspective view showing gas generator 48. Referring to FIGS. 8 to 10, case body 92 includes a bottom portion 94, a peripheral wall 95, and a flange portion 96. Bottom portion 94 is fixed to bottom lid 40. For example, bottom portion 94 is fixed to an inner surface of bottom lid 40 with an adhesive or the like.

Peripheral wall 95 is formed to rise upward from a peripheral edge portion of bottom portion 94. Peripheral wall 95 is formed to extend along the peripheral edge portion of bottom portion 94 in a closed shape. Peripheral wall 95 includes a rear wall 97, a front wall 98, and side wall portions 99A, 99B.

In FIG. 8, rear wall 97 is disposed upstream of gas agent 91 in direction D in which exhaust gas G flows. Film thickness T1 of rear wall 97 is larger than film thickness T2 of thin film portion 93. That is, rear wall 97 is "a thick film portion larger in thickness than the thin film portion." Rear wall 97 has a surface including a facing surface 105 and a back surface 106. Facing surface 105 is located upstream in direction D. Back surface 106 faces away from facing surface 105.

Front wall 98 is located downstream of gas agent 91 in direction D in which exhaust gas G flows. Front wall 98 is in contact with gas agent 91. Front wall 98 is smaller in height than rear wall 97. Rear wall 97 and front wall 98 have lower end portions, respectively, at the same position in the vertical direction. Accordingly, front wall 98 has an upper end portion on the back surface 106 side of rear wall 97 in the horizontal direction (or direction D).

Side wall portion 99A is formed to connect one end of rear wall 97 and one end of front wall 98. Side wall portion 99B is formed to connect the other end of rear wall 97 and the other end of front wall 98. Side wall portions 99A and 99B have upper end portions, respectively, formed so as to be inclined to be reduced in level in a direction from rear wall 97 toward front wall 98.

Flange portion 96 is formed so as to project outward from an upper end portion of peripheral wall 95. Flange portion 96 is formed so as to extend in a closed shape.

Case body 92 includes a plurality of resin layers and a barrier layer inserted between the resin layers. Specifically, case body 92 includes a resin layer 140, a barrier layer 141, and a resin layer 142.

Resin layer 140 is an outermost layer of case body 92, and resin layer 142 is an innermost layer of case body 92. Barrier layer 141 is disposed between resin layer 140 and resin layer 142. Barrier layer 141 has a liquid permeation rate smaller than that of resin layers 140, 142.

Resin layers 140 and 142 are formed of a resin material such as polypropylene (PP). Barrier layer 141 is formed of EVOH® resin (ethylene vinyl alcohol copolymer resin) or the like.

With barrier layer 141 disposed between resin layer 140 and resin layer 142, even if gas agent 91 in the form of a liquid leaks out to resin layer 140, barrier layer 141 can suppress external leakage of gas agent 91.

Thin film portion 93 is formed of resin or the like, for example. For example, GLAD press & seal (manufactured by GLAD) can be used.

Thin film portion 93 is provided so as to close opening 92a. Thin film portion 93 is adhered to an upper surface of flange portion 96. Thin film portion 93 is inclined downward in a direction from the upper end portion of rear wall 97 toward the upper end portion of front wall 98. Accordingly, thin film portion 93 is located on the back surface 106 side of rear wall 97 in direction D in which exhaust gas G flows. In the example shown in FIG. 8, thin film portion 93 is in contact with gas agent 91 on the front wall 98 side.

In FIG. 3, gas generator 49 is also formed in the same manner as gas generator 48. In power storage device 1 configured as described above, a specific cylindrical cell 43 may be overcharged, internally short-circuited or the like in some cases.

In FIG. 7, let us assume that cylindrical cell 43a is overcharged, internally short-circuited or the like. When cylindrical cell 43a is overcharged, internally short-circuited or the like, an exothermic reaction may excessively arise therein. When the exothermic reaction excessively arises, a gas is generated in a large amount and the internal pressure of cylindrical cell 43a increases. The increased internal pressure of cylindrical cell 43a generally promotes a chemical reaction and accordingly, further accelerates the exothermic reaction in cylindrical cell 43a.

When the internal pressure of cylindrical cell 43a increases to a predetermined pressure or more, exhausting portion 70 is broken. Then, exhaust gas G flows into ingress space 81 from the broken portion of exhausting portion 70. Exhaust gas G may contain substances such as $C_2H_4$, $CH_4$ and hydrogen. Further, exhaust gas G has a temperature for example of about 100° C. to 400° C.

Note that immediately after exhaust gas G is exhausted through exhausting portion 70, cylindrical cell 43a has a high internal pressure, and accordingly, a large amount of exhaust gas G instantaneously enters ingress space 81.

When exhaust gas G is discharged from cylindrical cell 43a, the internal pressure in cylindrical cell 43a decreases. When the internal pressure in cylindrical cell 43a is decreased, the exothermic reaction inside cylindrical cell 43a becomes relatively weak. Accordingly, when exhausting portion 70 is broken, and thereafter some period of time elapses, the amount of exhaust gas G discharged from exhausting portion 70 decreases. On the other hand, depending on the condition of cylindrical cell 43a, an amount of exhaust gas G may be continuously discharged.

As described above, immediately after exhausting portion 70 is broken, a large amount of exhaust gas G may instantaneously flow into ingress space 81, and thereafter, a relatively small amount of exhaust gas G may continue to flow into ingress space 81.

Exhaust gas G flowing into ingress space 81 flows in direction D and enters collection space 82. Thereafter, exhaust gas G passes through exhaust path 57, passes through exhaust channel 130 of fixing plate 14 and exhaust channel 89 of battery case 3, and is exhausted outside the vehicle.

If for example fixing plate 14 insufficiently contacts heat dissipating plate 42, a gap may be formed between fixing plate 14 and heat dissipating plate 42.

As has been described above, exhaust gas G having entered ingress space 81 flows in direction D toward collection space 82. In collection space 82, gas generator 48 is disposed.

In FIG. 8, exhaust gas G is blown to rear wall 97 of gas generator 48. Film thickness T1 of rear wall 97 is larger than film thickness T2. This suppresses heat of exhaust gas G reaching gas agent 91 even if a large amount of exhaust gas G is instantaneously blown to peripheral wall 95.

Thin film portion 93 is disposed on the back surface 106 side of rear wall 97. This suppresses exhaust gas G directly blown to thin film portion 93. This in turn suppresses heat of exhaust gas G transferred to gas agent 91 through thin film portion 93.

As a result, even if a large amount of exhaust gas G is instantaneously blown to gas generator 48, an increase of the temperature of gas agent 91 in gas generator 48 (or internal temperature of gas generator 48) is suppressed.

On the other hand, if exhaust gas G continues to be discharged from cylindrical cell 43a, exhaust gas G will continuously be blown to rear wall 97. As a result, heat of exhaust gas G reaches gas agent 91 through rear wall 97. Gas agent 91 is heated, and when the temperature thereof (or the internal temperature of gas generator 48) has reached a predetermined temperature or higher, gas agent 91 starts to evaporate. As a result, the internal pressure in reservoir case 90 increases. Note that the above predetermined temperature is the boiling point temperature of gas agent 91. In the present embodiment, it is about 50° C.

Figure 11:
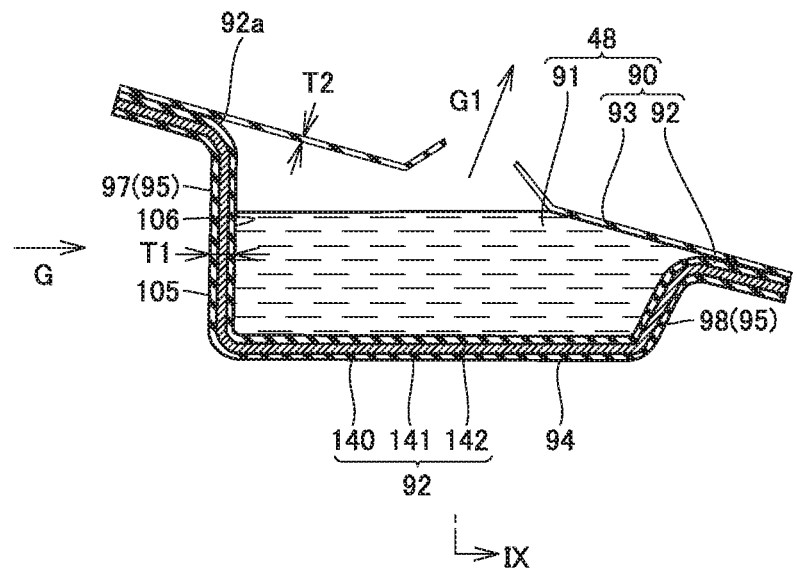
FIG. 11 is a cross-sectional view of gas generator 48 when a thin film portion 93 is ruptured.

Since film thickness T2 of thin film portion 93 is small, thin film portion 93 is ruptured. FIG. 11 is a cross sectional view of gas generator 48 when thin film portion 93 is ruptured.

When thin film portion 93 is ruptured, supply gas G1 which is a gas of gas agent 91 blows out of reservoir case 90. This supply gas G1 is supplied into collection space 82 of exhaust channel 85 in FIG. 7 and mixes with exhaust gas G discharged from cylindrical cell 43a.

This can reduce the concentration of exhaust gas G leaking from a gap formed between fixing plate 14 and heat dissipating plate 42.

This can suppress leakage of substances such as $C_2H_4$, $CH_4$ and hydrogen having high concentration from battery module 11.

Note that gas agent 91 has high water-repellent and insulating properties, and is thus less likely to make vehicle-mounted, surrounding equipment wet or cause short circuit or the like if gas agent 91 in the form of a mist adheres to a periphery of the battery module.

When an aqueous solution of potassium carbonate is used as gas agent 91, the temperature of exhaust gas G can be reduced, and leakage of exhaust gas G of high temperature from battery module 11 can be suppressed.

Note that, with reference to FIG. 8, in reservoir case 90, there is an air layer 91a above gas agent 91. Air layer 91a has a low heat transfer coefficient. Accordingly, the heat transferred to rear wall 97 as exhaust gas G is blown to rear wall 97 is transferred to gas agent 91 through rear wall 97 mainly at a portion which is in contact with gas agent 91. Further, heat applied to thin film portion 93 is transferred to gas agent 91 through thin film portion 93 mainly at a portion which is in contact with gas agent 91.

In FIG. 7, gas generator 48 is disposed in collection space 82 located downstream of ingress space 81 in direction D. Accordingly, even when not only cylindrical cell 43a but also another cylindrical cell 43 blows exhaust gas G, exhaust gas G blown out of that other cylindrical cell 43 flows into collection space 82. Accordingly, exhaust gas G blown out of any cylindrical cell 43 can drive gas generator 48.

Gas generator 48 uses heat of exhaust gas G to supply supply gas G1. Accordingly, gas generator 48 can be driven for example even when the ECU of vehicle 2 is not in operation and exhaust gas G is blown out of cylindrical cell 43.

While in the above description an example where a gap is formed between fixing plate 14 and heat dissipating plate 42 has been described, a similar effect can also be achieved when there is a gap between fixing plate 14 and battery case 3.

While in the above embodiment an example where film thickness T1 of case body 92 is larger than film thickness T2 of thin film portion 93 has been described, film thickness T1 may be or substantially be equal to film thickness T2.

In that case, even in an initial stage when exhaust gas G is blown out, heat of exhaust gas G is transferred to gas agent 91 through rear wall 97. As a result, even in the initial state when exhaust gas G is blown out, gas agent 91 can evaporate, and supply gas G1 can be supplied into exhaust channel 85.

This can suppress exhaust gas G, hydrogen, or the like to be low in concentration even if a large amount of exhaust gas G leaks through a gap between fixing plate 14 and heat dissipating plate 42.

While in the above embodiment an example where such a configuration as shown in FIG. 8 is adopted as gas generator 48 has been described, gas generator 48 may be of a variety of shapes.

Figure 12:
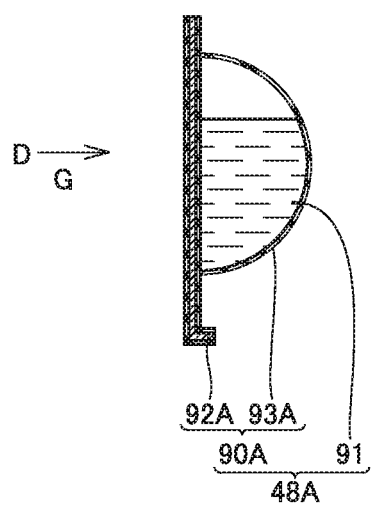
FIG. 12 is a cross-sectional view showing a gas generator 48A which is a modified example of the gas generator.

FIG. 12 is a cross-sectional view showing a gas generator 48A which is a modified example of the gas generator. Gas generator 48A includes a reservoir case 90A and gas agent 91 reserved in reservoir case 90A.

Reservoir case 90A includes a case body 92A and a thin film portion 93A. The film thickness of case body 92A is larger than the film thickness of thin film portion 93A.

Case body 92A is disposed upstream of gas agent 91 in direction D in which exhaust gas G flows. Thin film portion 93A is disposed on the side of the back surface of case body 92A.

Gas generator 48A also suppresses exhaust gas G directly blown to thin film portion 93A. This can suppress heat of exhaust gas G transferred to gas agent 91 through thin film portion 93A. Accordingly, when exhaust gas G is continuously discharged, supply gas G1 can be supplied to exhaust channel 85.

While in the above embodiment an example in which a battery cell is adopted as a power storage element and a secondary battery is used as a power storage device has been described, the configuration of the present disclosure is also applicable to a capacitor that is a unit capacitor as a power storage element.

Second Embodiment

A power storage device according to a second embodiment will be described with reference to FIGS. 13 to 20, and FIGS. 1 to 12, as required. Note that the power storage device according to the second embodiment, as well as power storage device 1 according to the first embodiment, comprises battery case 3, battery unit 4, and fan 5. While in power storage device 1 according to the first embodiment gas generators 48, 49 are provided in exhaust path 80, in the power storage device according to the second embodiment, instead of gas generator 48, 49, a gas generator 200 is provided.

Figure 13:
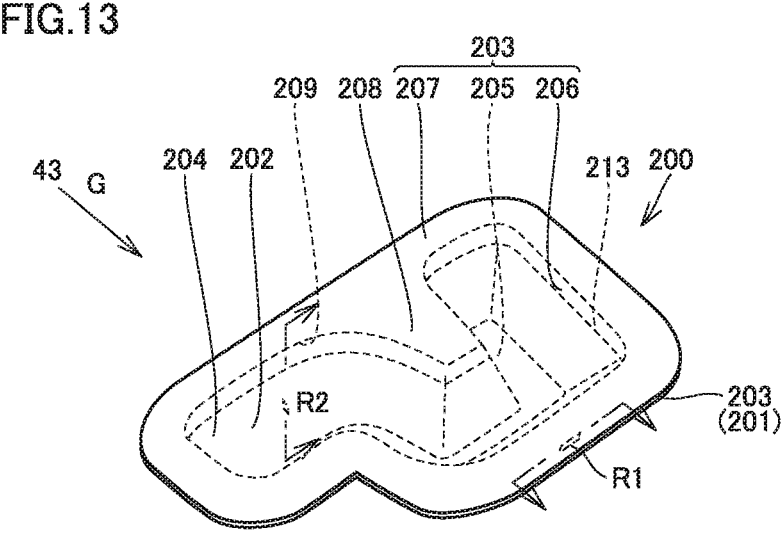
FIG. 13 is a perspective view showing a gas generator 200.
Figure 14:
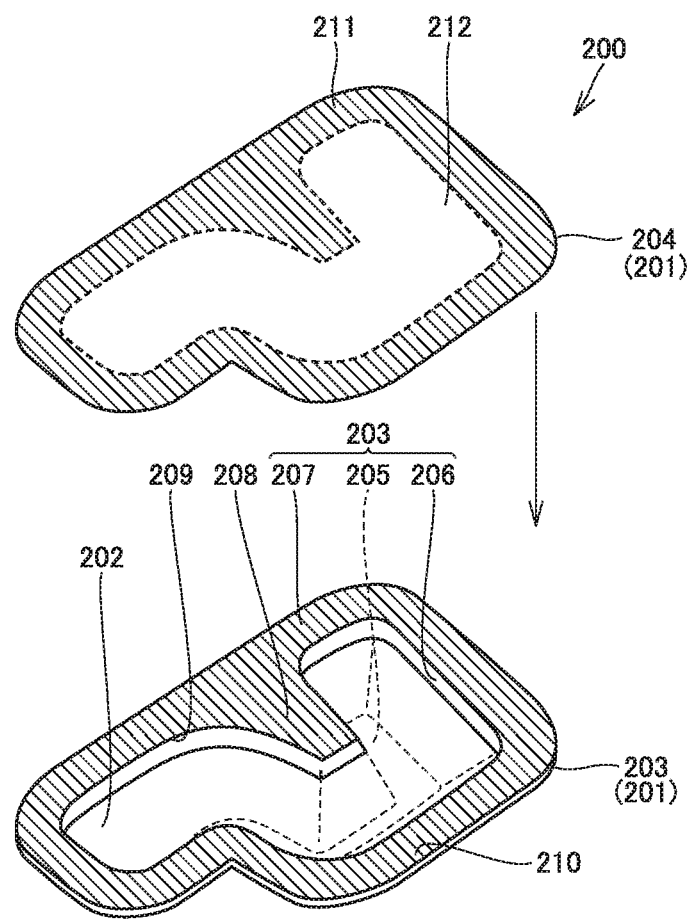
FIG. 14 is an exploded perspective view showing gas generator 200.

Accordingly, in the second embodiment, a configuration of gas generator 200 will be described in detail. FIG. 13 is a perspective view showing gas generator 200, and FIG. 14 is an exploded perspective view showing gas generator 200.

Gas generator 200 includes a reservoir case 201 and a gas agent 202. Gas agent 202 is the same as the gas agent of the first embodiment. Reservoir case 201 includes a case body 203 and a thin film portion 204.

Case body 203 includes a bottom portion 205, a peripheral wall portion 206, and a flange portion 207. Bottom portion 205 is adhered to an upper surface of bottom lid 40 shown in FIG. 3. Peripheral wall portion 206 is formed so as to extend upward from a peripheral edge portion of bottom portion 205.

Peripheral wall portion 206 has an upper end portion formed in a closed shape, and an opening 209 is formed by the upper end portion of peripheral wall portion 206 extending in the closed shape.

Flange portion 207 is formed to extend from the upper end portion of peripheral wall portion 206 horizontally in a direction away from the upper end portion of peripheral wall portion 206.

At bottom portion 205, a protrusion 208 protruding toward opening 209 is formed. In the example shown in FIG. 14, it is connected to an inner peripheral surface of peripheral wall portion 206. Protrusion 208 and flange portion 207 are formed so that an upper end surface of protrusion 208 and an upper surface of flange portion 207 are flush with each other.

The upper end surface of protrusion 208 and the upper surface of flange portion 207 form an adhesion surface 210 to which thin film portion 204 is thermally welded. Adhesion surface 210 is formed in a closed shape along an opening edge portion of opening 209. Note that for case body 203 shown in FIG. 14, a hatched portion is adhesion surface 210.

Thin film portion 204 is thermally welded to adhesion surface 210 of case body 203 so as to close opening 209 of case body 203. The method of adhering case body 203 and thin film portion 204 is not limited to thermal welding, and an adhesive agent or the like may be used.

Thin film portion 204 includes an adhesion portion 211 adhered to adhesion surface 210 and a non-adhesion portion 212 which is not adhered to adhesion surface 210. Note that in thin film portion 204 shown in FIG. 14, a hatched portion is adhesion portion 211. Thin film portion 204 is disposed so as to extend horizontally when bottom portion 205 is adhered to a horizontal plane.

By adhering thin film portion 204 to case body 203, a reserving space 213 for reserving gas agent 202 is formed in reservoir case 201, as shown in FIG. 13.

Figure 15:
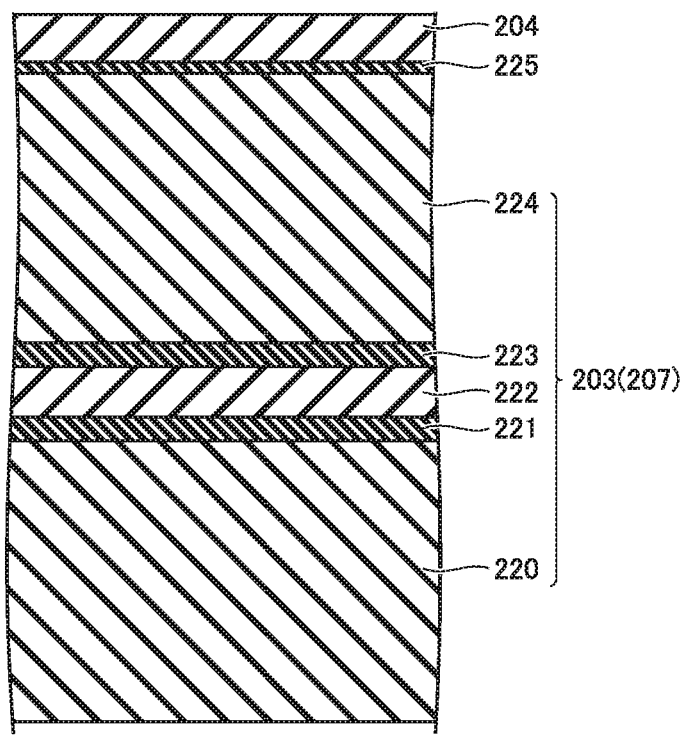
FIG. 15 is a cross-sectional view taken at a cross-sectional portion R1 shown in FIG. 13.

FIG. 15 is a cross-sectional view taken at a cross-sectional portion R1 shown in FIG. 13. Case body 203 includes a resin layer 220, an adhesive layer 221, a barrier layer 222, an adhesive layer 223, and a resin layer 224.

Resin layer 220 and resin layer 224 are formed for example of a resin material such as polypropylene (PP). Barrier layer 222 is formed of EVOH® resin (ethylene vinyl alcohol copolymer resin) or the like. Adhesive layers 221 and 223 are for example epoxy resin. Thin film portion 204 is for example GLAD press & seal (manufactured by GLAD). Thin film portion 204 is formed between resin layer 220 and resin layer 224.

Figure 16:
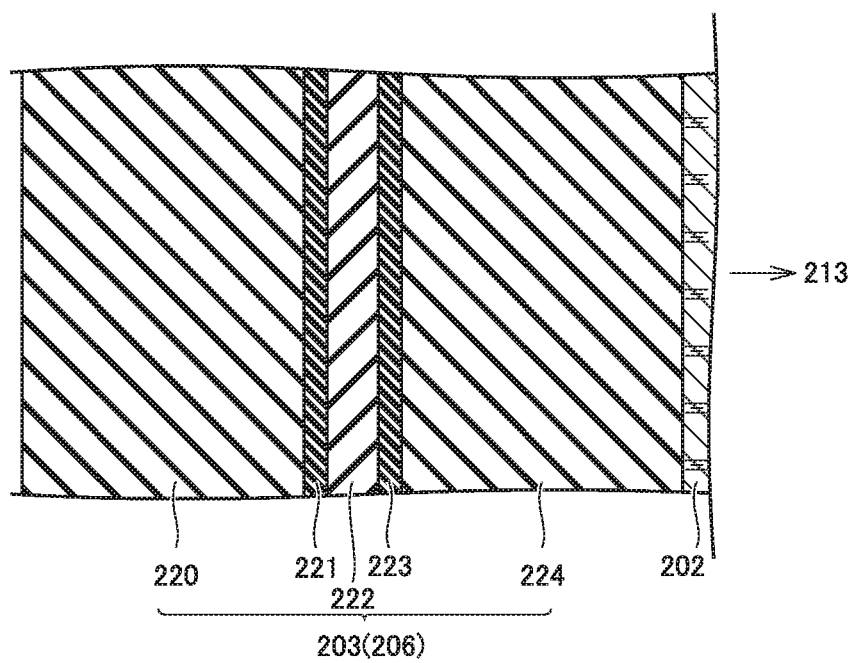
FIG. 16 is a cross-sectional view at a cross-sectional portion R2 shown in FIG. 13 and is a cross-sectional view at a peripheral wall portion 206.

FIG. 16 is a cross-sectional view at a cross-sectional portion R2 shown in FIG. 13 and is a cross-sectional view at peripheral wall portion 206.

As shown in FIG. 16, reserving space 213 is defined by an inner wall surface formed of resin layer 224. Gas agent 202 is in contact with resin layer 224. Case body 203 has an external surface formed of resin layer 220.

Thus, case body 203 of gas generator 200 of the second embodiment is configured to be similar to case body 92 of gas generator 48 of the first embodiment, and can thus suppress external exudation of gas agent 202 through case body 203.

Gas generator 200 configured as described above will now be described in comparison with a gas generator 200A according to a comparative example.

Figure 17:
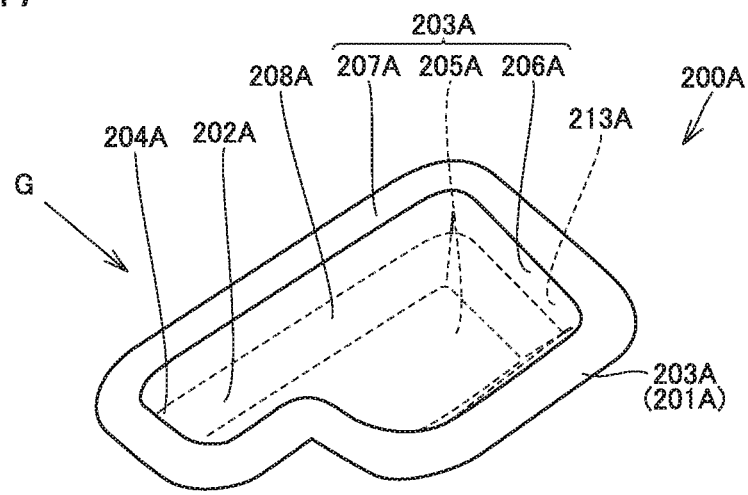
FIG. 17 is a perspective view showing a gas generator 200A according to a comparative example.

FIG. 17 is a perspective view showing gas generator 200A according to the comparative example. Gas generator 200A includes a reservoir case 201A and a gas agent 202 contained in a reserving space 213A formed in reservoir case 201A. Reservoir case 201A includes a case body 203A and a thin film portion 204A. Case body 203A is formed of the same material(s) as case body 203. Case body 203A has a bottom portion 205A adhered to bottom lid 40 of battery module 11 shown in FIG. 3 or the like. Thin film portion 204A is formed of the same material(s) as thin film portion 204. Gas agent 202A is also the same material(s) and charged in the same amount as gas agent 202 of gas generator 200.

Gas generator 200A is identical in configuration and shape to gas generator 200 of the second embodiment except that the former does not have protrusion 208.

Accordingly, reserving space 213A of gas generator 200A is larger than reserving space 213 of gas generator 200 as the former does not have protrusion 208. Gas agent 202A has a top surface, or a liquid level, lower than that of gas agent 202.

Since gas agent 202A has a low liquid level, gas agent 202A and case body 203A have a smaller contact area therebetween than gas agent 202 and case body 203 do.

Specifically, gas agent 202A and peripheral wall portion 206A have a smaller contact area therebetween than gas agent 202 and peripheral wall portion 206 do.

A case will be described in which exhaust gas G is blown from cylindrical cell 43 in a state in which gas generators 200, 200A configured as described above have bottom portions 205, 205A adhered to bottom lid 40 shown in FIG. 3.

With reference to FIG. 13, gas generator 200 will be described. When exhaust gas G is blown from cylindrical cell 43 to gas generator 200, exhaust gas G is blown to peripheral wall portion 206 of case body 203.

The temperature of peripheral wall portion 206 increases, and heat from exhaust gas G is transferred to gas agent 202 through peripheral wall portion 206. Gas agent 202 has a liquid level below thin film portion 204, and even when thin film portion 204 is exposed to exhaust gas G, it is difficult to transfer heat of exhaust gas G through thin film portion 204 to gas agent 202, and the heat of exhaust gas G is transferred to gas agent 202 mainly through peripheral wall portion 206.

Once gas agent 202 has reached a predetermined temperature or higher, gas agent 202 evaporates, and the internal pressure in reservoir case 201 increases. Then, thin film portion 204 is ruptured or the like, and gas agent 202 blows out of gas generator 200.

Note that case body 203 contacts gas agent 202 over a large area, and when case body 203 transfers heat from exhaust gas G to gas agent 202, gas agent 202 is easily heated uniformly. This suppresses temperature variation in gas agent 202, and when gas agent 202 evaporates, substantially the entire gas agent 202 evaporates instantly.

Accordingly, the timing of evaporating gas agent 202 can be adjusted by adjusting the film thickness of case body 203. By case body 203 having a predetermined film thickness, a design can be made to blow out gas agent 202 for example one minute after exhaust gas G starts to be blown to gas generator 200.

Gas generator 200A will now be described with reference to FIG. 17. When exhaust gas G is blown to gas generator 200A, exhaust gas G is blown to peripheral wall portion 206A.

Since gas agent 202A has a liquid level lower than that of gas generator 200, gas agent 202A contacts peripheral wall portion 206A over a smaller area than in gas generator 200.

Accordingly, gas agent 202A tends to have temperature variation, and be locally heated to high temperature and partially evaporate. When gas agent 202A is partially evaporated, the internal pressure in reservoir case 201A increases, and thin film portion 204A peels off case body 203A so that a gap may be formed between thin film portion 204A and case body 203A.

When a gap is formed between thin film portion 204A and case body 203A, gas agent 202A having evaporated is blown through the gap, and a portion of gas agent 202A in the form of liquid is also dragged and easily blown outside. It is difficult to predict temperature variation arising in gas agent 202A, and it is thus difficult for gas generator 200A to preset a timing of blowing out gas agent 202A.

That is, gas generator 200 according to the second embodiment has a configuration which helps to set a timing of blowing out gas agent 202.

Third Embodiment

Figure 18:
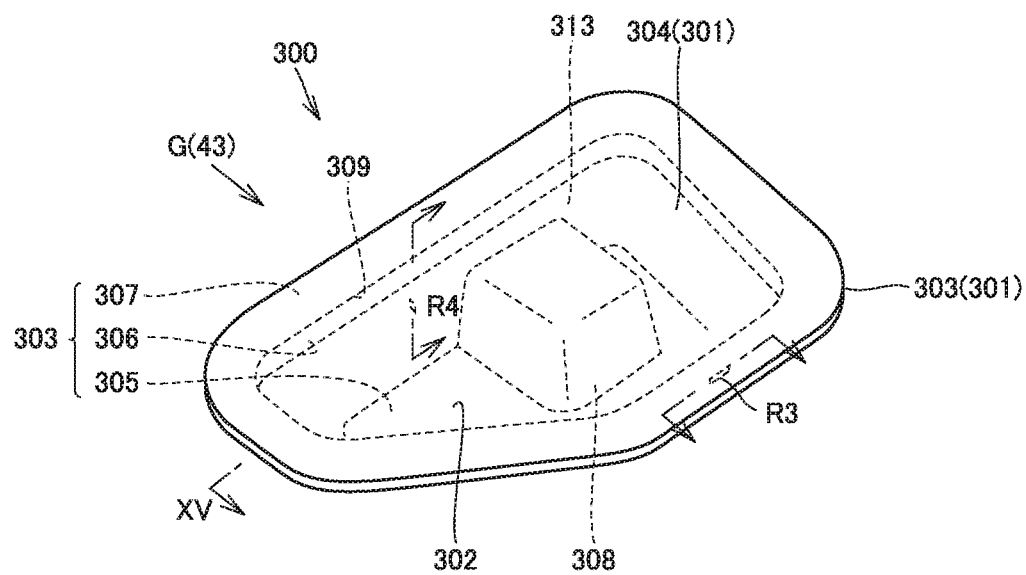
FIG. 18 is a perspective view showing a gas generator 300.
Figure 19:
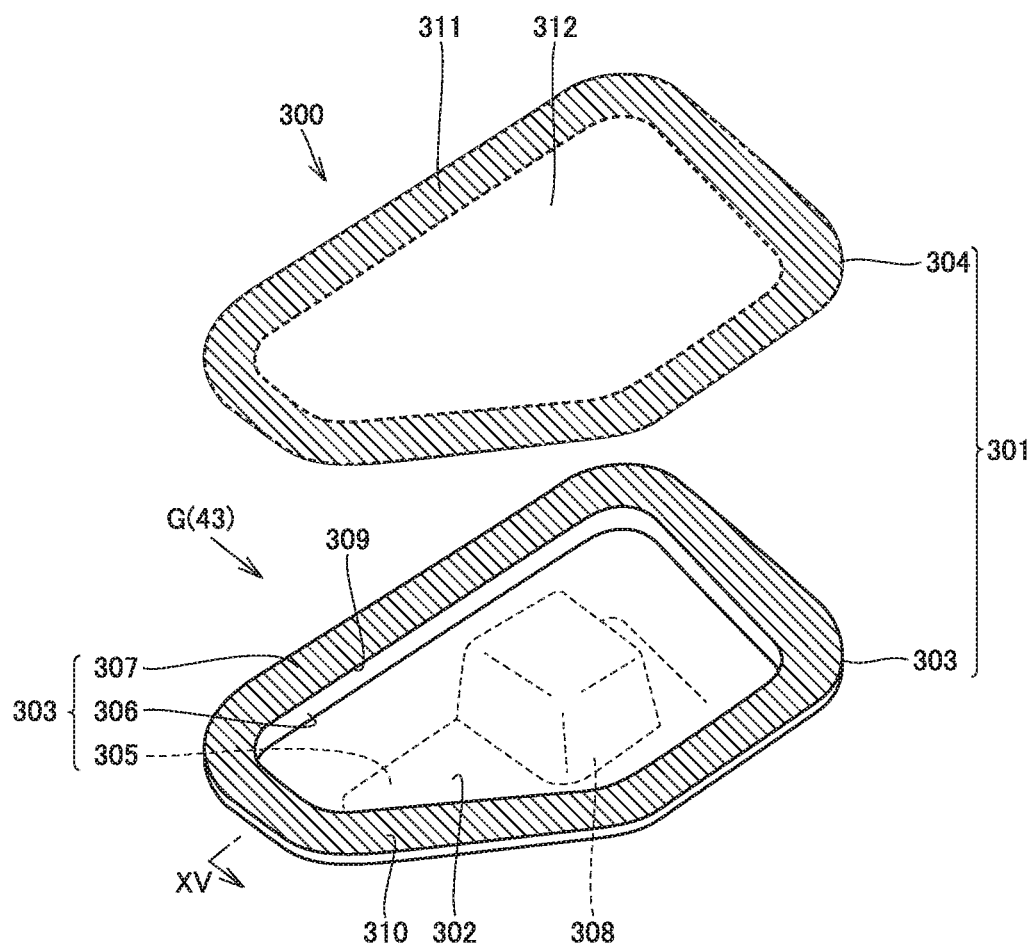
FIG. 19 is an exploded perspective view showing gas generator 300.

With reference to FIG. 18 and so forth, a gas generator 300 according to a third embodiment will be described. FIG. 18 is a perspective view showing gas generator 300, and FIG. 19 is an exploded perspective view showing gas generator 300. Gas generator 300 includes a reservoir case 301 and a gas agent 302. Reservoir case 301 includes a case body 303 and a thin film portion 304. Inside reservoir case 301A, a reserving space 313 in which gas agent 302 is sealed is formed, and reservoir case 301 has a bottom portion 305, a peripheral wall portion 306, and a flange portion 307. An opening 309 is formed by an upper end portion of peripheral wall portion 306 extending in a closed shape.

At bottom portion 305, a protrusion 308 protruding toward opening 309 is formed. In the third embodiment, protrusion 308 does not reach opening 309, and protrusion 308 has an upper surface below opening 309.

Thus, gas generator 300 also has protrusion 308, and, as well as gas generator 200 according to the second embodiment, when compared with the gas generator without protrusion 308, gas generator 300 can have a raised liquid level. As a result, gas agent 302 can be brought into contact with peripheral wall portion 306 over an increased area.

Flange portion 307 is formed so as to protrude horizontally from an upper end portion of peripheral wall portion 306. Thin film portion 304 is thermally welded to an upper surface of flange portion 307, and the upper surface of flange portion 307 is an adhesion surface 310 to which thin film portion 304 is thermally welded. Adhesion surface 310 is formed in a closed shape along an opening edge portion of opening 309.

Thin film portion 304 includes an adhesion portion 311 thermally welded to adhesion surface 310 and a non-adhesion portion 312 which is not adhered to adhesion surface 310.

Figure 20:
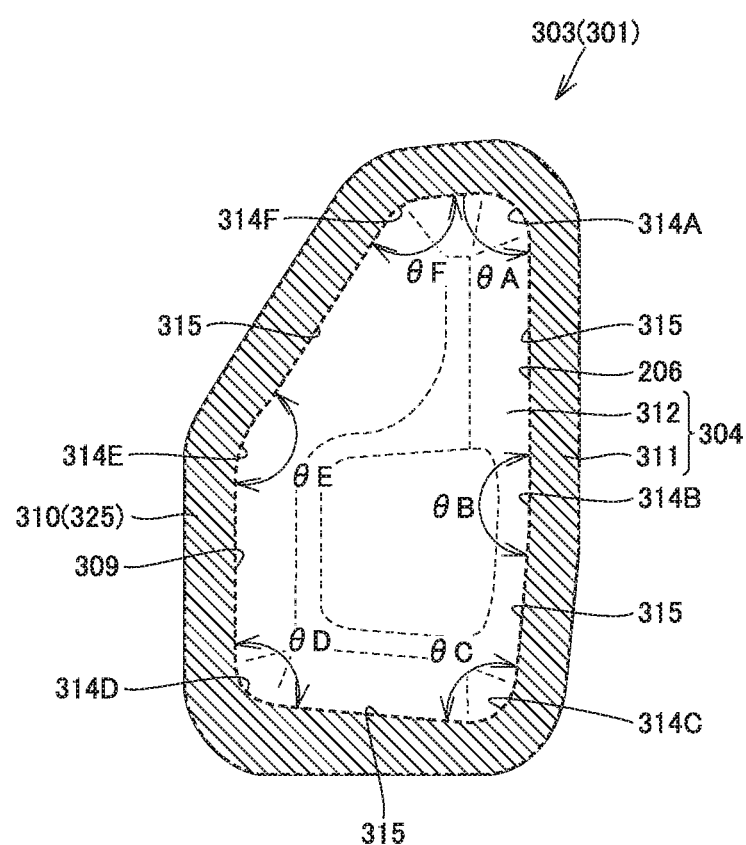
FIG. 20 is a plan view showing a reservoir case 301.

FIG. 20 is a plan view showing reservoir case 301. Case body 303 has opening 309 with an opening edge portion including a plurality of corner portions 314A, 314B, 314C, 314D, 314E, 314F and a plurality of side portions 315.

Corner portions 314A, 314B, 314C, 314D, 314E, 314F have opening angles $\theta A$, $\theta B$, $\theta C$, $\theta D$, $\theta E$, $\theta F$, respectively, of 85 degrees or more and less than 180 degrees. Corner portions 314A, 314B, 314C, 314D, 314E, 314F are formed in an arcuate shape, and each corner portion 314A, 314B, 314C, 314D, 314E, 314F has a radius of curvature of about several millimeters, e.g., about 3 mm or more and 9 mm or less.

Figure 21:
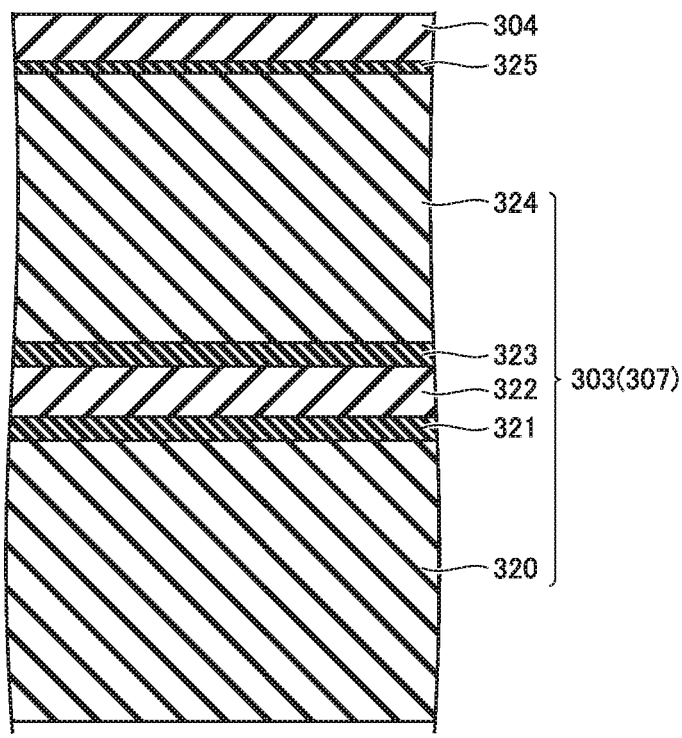
FIG. 21 is a cross-sectional view taken at a cross-sectional portion R3 shown in FIG. 18.

FIG. 21 is a cross-sectional view taken at a cross-sectional portion R3 shown in FIG. 18. Case body 303 includes a resin layer 320, an adhesive layer 321, a barrier layer 322, an adhesive layer 323, and a resin layer 324. A thermally welding layer 325 is formed on the upper surface of resin layer 324, and by thermally welding layer 325 thin film portion 304 is adhered to the upper surface of resin layer 324. Note that thermally welding layer 325 is formed in a closed shape, and has an inner peripheral edge portion matching or substantially matching the opening edge portion of opening 309 shown in FIG. 20.

Returning to FIG. 21, barrier layer 322 is provided between resin layer 320 and resin layer 324, and barrier layer 322 is adhered to resin layers 320, 324 by adhesive layers 321, 323. Resin layers 320, 324 are formed of the same material(s) as resin layers 220, 224, and adhesive layers 321, 323 are formed of the same material(s) as adhesive layers 221, 223. Barrier layer 322 is formed of nylon.

Figure 22:
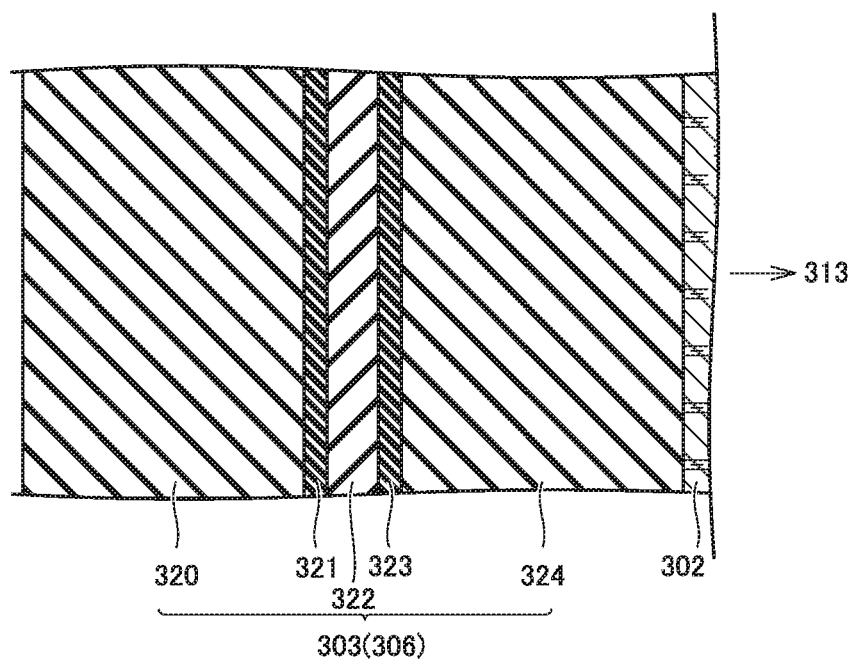
FIG. 22 is a cross-sectional view taken at a cross-sectional portion R4 shown in FIG. 18.

FIG. 22 is a cross-sectional view taken at a cross-sectional portion R4 shown in FIG. 18. Reserving space 313 is defined by an inner wall surface formed of resin layer 324. Resin layer 320 is exposed at an external surface of case body 303.

Barrier layer 322 is formed of nylon, and resin layers 320, 324 are formed of PP (polypropylene). There is a high peeling strength between polypropylene and nylon, which suppresses peeling of barrier layer 322 and resin layer 320, 324 off each other. Nylon has a liquid permeation rate smaller than that of polypropylene, and can thus suppress external leakage of gas agent 302 through case body 303.

When exhaust gas G is blown to gas generator 300 configured as described above, as shown in FIG. 19, exhaust gas G is blown directly to peripheral wall portion 306, and heat of exhaust gas G is transferred to gas agent 302 mainly through peripheral wall portion 306.

Note that gas agent 302 contacts peripheral wall portion 306 over a large area, and, similarly as described for gas generator 200 according to the second embodiment, a timing of blowing gas agent 302 instantly when exhaust gas G is blown to gas generator 300 can be adjusted by adjusting the film thickness of reservoir case 301. This allows gas agent 302 to be blown after exhaust gas G is blown to reservoir case 301 when a preset predetermined period of time has elapsed.

Gas agent 302 may partially evaporate depending on how exhaust gas G is blown to peripheral wall portion 306. As a result, the internal pressure in gas generator 300 may increase before the preset predetermined period of time elapses.

In that case, in FIGS. 19 and 20, as the internal pressure of gas generator 300 increases, non-adhesion portion 312 experiences a load in a direction to move away from case body 303. Accordingly, a tensile force is applied to thermally welding layer 325 between adhesion portion 311 of thin film portion 304 and adhesion surface 310 of case body 303.

Thermally welding layer 325 has an inner peripheral edge portion matching or substantially matching the opening edge portion of opening 309, and thermally welding layer 325 tends to experience large stress concentration at a portion located at each corner portion 314A, 314B, 314C, 314D, 314E, 314F.

However, opening angles θA, θB, θC, θD, θE, θF are 85 degrees or more and less than 180 degrees. This suppresses excessive tensile force applied to thermally welding layer 325 at each corner portion 314A, 314B, 314C, 314D, 314E, 314F.

If gas agent 302 partially evaporates, and the internal pressure in gas generator 300 increases after exhaust gas G is started to be blown before a preset predetermined period of time elapses, thermally welding layer 325 can be prevented from being damaged to permit thin film portion 304 to be peeled off case body 303, or to cause a gap between thin film portion 304 and case body 303.

On the other hand, when corner portions 314A, 314B, 314C, 314D, 314E, 314F have opening angles θA, θB, θC, θD, θE, θF smaller than 85 degrees, thermally welding layer 325 may experience a large stress concentration at a portion corresponding to corner portions 314A, 314B, 314C, 314D, 314E, 314F. Similarly, when corner portions 314A, 314B, 314C, 314D, 314E, 314F have opening angles θA, θB, θC, θD, θE, θF of 180 degrees or more, thermally welding layer 325 may experience a large stress concentration at a portion corresponding to corner portions 314A, 314B, 314C, 314D, 314E, 314F. When the internal pressure in gas generator 300 increases before the preset predetermined period of time elapses, a load is also applied to case body 303.

As a result, a large internal stress is generated in case body 303, and a load may be applied in a direction to separate barrier layer 322 and resin layers 320, 324 from each other. However, peeling strength (N/mm) of resin layers 320, 324 and barrier layer 322 is high, and peeling between barrier layer 322 and resin layers 320, 324 can thus be suppressed.

When barrier layer 322 and resin layers 320 and 324 are peeled off, case body 303 is reduced in rigidity and may be significantly deformed. If case body 303 is significantly deformed, resin layer 324 may be ruptured and gas agent 302 may leak through the ruptured portion. Furthermore, case body 303 may have opening 309 deformed, and thin film portion 304 may peel off case body 303.

Gas generator 300 according to the third embodiment can suppress peeling between barrier layer 322 and resin layers 320 and 324, and thus suppress such a problem as above.

Further, protrusion 308 is shaped to protrude from bottom portion 305, and before a preset predetermined period of time elapses when the internal pressure in gas generator 300 is increased a large load may be applied to protrusion 308. When protrusion 308 is deformed, a portion of peripheral wall portion 306 connected to protrusion 308 and the like may be deformed. Even if protrusion 308 and a portion of peripheral wall portion 306 are deformed, protrusion 308 is separate from opening 309, and deformation of opening 309 can thus be suppressed. If opening 309 is deformed, a gap is easily formed between case body 303 and thin film portion 304. However, gas generator 300 according to the third embodiment can suppress such a problem as described above.

Figure 23:
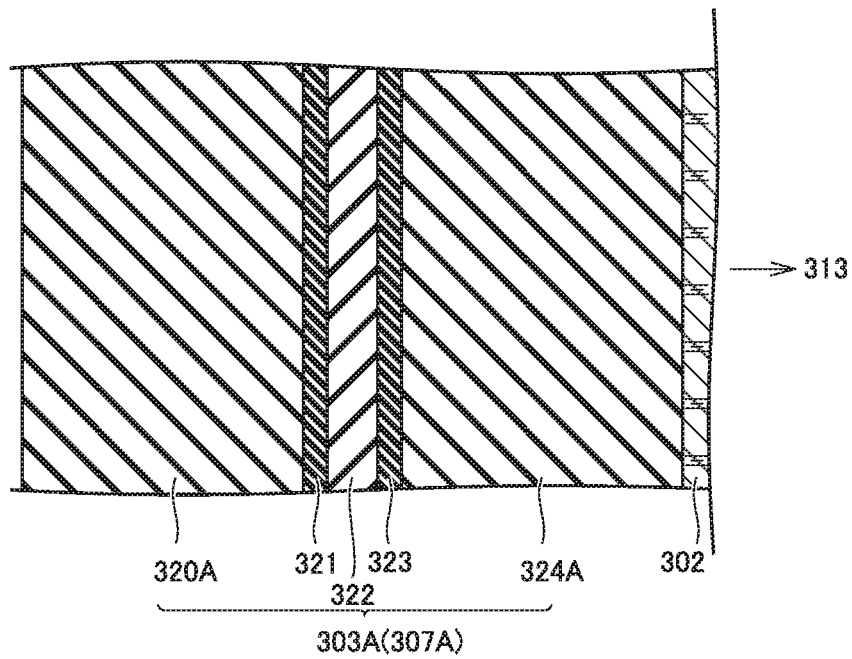
FIG. 23 is a cross-sectional view showing a portion of a gas generator 300A which is a modified example of gas generator 300.

FIG. 23 is a cross-sectional view showing a portion of a gas generator 300A which is a modified example of gas generator 300. The shape of gas generator 300A is the same as that of gas generator 300.

Gas generator 300A includes a case body 303A, and case body 303A includes a resin layer 320A, an adhesive layer 321, a barrier layer 322, an adhesive layer 323, and a resin layer 324A.

Resin layers 320A and 324A are formed of nylon, and barrier layer 322 is also made of nylon. Thus forming resin layers 320A and 324A and barrier layer 322 of nylon allows peeling strength (N/mm) of resin layers 320A, 321A and barrier layer 322 to be increased. This can suppress peeling of resin layers 320A and 321A and barrier layer 322.

EXAMPLES

Peeling strength (N/mm) and barrier performance of case bodies 203, 303, 303A of gas generators 200, 300, 300A will be described with reference to FIG. 24 and Table 1.

Figure 24:
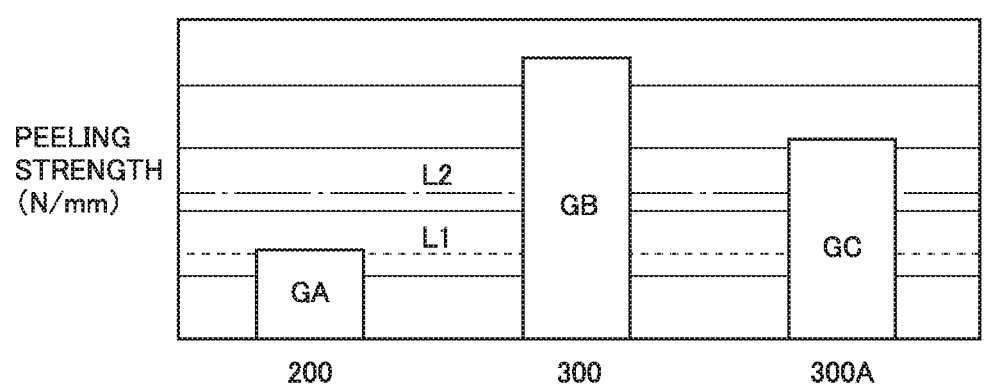
FIG. 24 is a graph showing peeling strength (N/mm) of case bodies 203, 303, 303A of gas generators 200, 300, 300A.

FIG. 24 is a graph showing peeling strength (N/mm) of case bodies 203, 303, 303A of gas generators 200, 300, 300A.

In FIG. 24, "200" represents case body 203 of gas generator 200 of the second embodiment, and "GA" represents peeling strength (N/mm) between resin layers 220, 224 and barrier layer 222 of case body 203. Case body 203 has a film thickness of 0.5 mm. Case body 203 is formed by vacuum-forming.

In FIG. 24, "300" represents case body 303 of gas generator 300 of the third embodiment, and "GB" represents peeling strength (N/mm) between resin layers 320, 324 and barrier layer 322 of case body 303. Case body 303 has a film thickness of 1.0 mm. Case body 303 is formed by vacuum-forming.

In FIG. 24, "300A" represents case body 303A of gas generator 300A of a modified example of the third embodiment, and "GC" represents peeling strength (N/mm) between resin layers 320A, 324A and barrier layer 322 of case body 303A. Case body 303A is formed by injection molding. Case body 303A has a film thickness of 0.5 mm.

Note that graphs GA and GB represent average values of values of peeling strength of a plurality of gas generators 200 and 300, as measured while battery module 11 shown in FIG. 3 has an internal temperature maintained at 60° C. for 250 hours to 1060 hours. Graph GC is a value calculated from peeling strength of nylon and epoxy resin.

In the graph, a broken line L1 represents minimum required peeling strength. An alternate long and short dashed line L2 represents preferable peeling strength.

As shown in FIG. 24, it can be seen that any of case bodies 203, 303, 303A ensures minimum required peeling strength. In particular, it can be seen that case bodies 303, 303A can obtain large peeling strength.

Table 1 below shows barrier performance of case bodies 203, 303, 303A of gas generators 200, 300, 300A. Specifically, barrier performance indicates an amount of a gas agent permeating through a case body while battery module 11 has an internal temperature maintained at 50° C. "C" indicates that an amount of a gas agent permeating through a case body is larger than a specified amount. "B" indicates that an amount of a gas agent permeating through a case body is smaller than the specified amount. "A" indicates that no permeation of a gas agent was able to be confirmed.

TABLE 1

|  | Gas Generator 200 | Gas Generator 300 | Gas Generator 300A |
|---|---|---|---|
| Barrier Performance | A | A | A |

As is also apparent from Table 1 above, it can be seen that high barrier performance can be obtained in any of case bodies 203, 303, 303A of gas generators 200, 300, 300A.

Although the present disclosure has been described and illustrated in detail, it is clearly understood that the same is by way of illustration and example only and is not to be taken by way of limitation, the scope of the present subject matter being interpreted by the terms of the appended claims.

What is claimed is:

1. A power storage module comprising:
a plurality of power storage elements;
a power storage case accommodating the plurality of power storage elements; and
a gas generator disposed in the power storage case, the plurality of power storage elements each having an exhausting portion,
the power storage case having an exhaust channel formed therein to pass an exhaust gas exhausted from the exhausting portion,
the gas generator being disposed in the exhaust channel, the gas generator supplying a supply gas into the exhaust channel when the gas generator attains an internal temperature equal to or higher than a predetermined temperature, wherein
the gas generator includes a gas agent that serves as the supply gas as the gas agent evaporates, and a reservoir case that reserves the gas agent, the reservoir case includes a case body having an opening and a thin film portion being disposed to close the opening,
a thickness of the reservoir case being larger than a thickness of the thin film portion,
the case body including a bottom portion and a peripheral wall,
the peripheral wall being formed to rise upward from a peripheral edge portion of the bottom portion,
the peripheral wall includes a rear wall and a front wall,
the rear wall is disposed upstream of the front wall in a direction in which exhaust gas flows,
the thin film portion and the opening are inclined downward in a direction from an upper end portion of the rear wall toward an upper end portion of the front wall.

2. The power storage module according to claim 1, wherein the case body is in contact with the gas agent.

3. The power storage module according to claim 1, wherein
the exhaust channel includes an ingress space receiving the exhaust gas exhausted from the exhausting portion, and
the gas generator is disposed downstream of the ingress space in a direction in which the exhaust gas flows.

4. The power storage module according to claim 1, wherein
the bottom portion is formed with a protrusion protruding toward the opening.

5. The power storage module according to claim 4, wherein
a bonding portion at which the thin film portion and the case body are adhered together is formed along the opening, and
the protrusion has an upper end portion below the opening.

6. The power storage module according to claim 5, wherein
the case body includes a first resin layer, a barrier layer, and a second resin layer,
the barrier layer is provided between the first resin layer and the second resin layer and is adhered to the first resin layer and the second resin layer,
the first resin layer and the second resin layer are formed of polypropylene, and
the barrier layer is formed of nylon.

7. The power storage module according to claim 4, wherein
a bonding portion at which the thin film portion and the case body are adhered together is formed along the opening,
the opening has an opening edge portion including a plurality of arcuate corner portions and a plurality of side portions, and
the corner portions each have an opening angle of 85 degrees or more and less than 180 degrees.

* * * * *